Nov. 25, 1958 W. A. HERTEL 2,861,591
FUEL SELECTOR VALVE
Filed Sept. 13, 1954

INVENTOR.
WILLIAM A. HERTEL
BY
RICHEY, WATTS, EDGERTON & McNENNY
Donald W. Farrington
ATTORNEYS

United States Patent Office 2,861,591
Patented Nov. 25, 1958

2,861,591

FUEL SELECTOR VALVE

William Andrew Hertel, Cleveland, Ohio, assignor to The Weatherhead Company, Cleveland, Ohio, a corporation of Ohio Application September 13, 1954, Serial No. 455,660

2 Claims. (Cl. 137—607)

This invention relates to a valve and more particularly to a valve for connecting an outlet line to either of two sources of supply.

Automobile trucks currently in use generally carry a cylindrical tank of fuel at the rear of the truck cab at each side of the truck chassis. The fuel lines between the supply tanks and the motor are generally provided with a number of valves so that either of the two fuel tanks may be used selectively.

It is among the objects of the present invention to provide a fuel selector valve having a pair of spaced inlet ports and a rockable valve closure member which is biased to close either one or the other of said ports.

It is a further object of my invention to provide a fuel selector valve according to the preceding object wherein a resilient member is arranged between a manually operated actuator and said rockable valve closure.

It is a further object of my invention to provide a selector valve including a chamber having an outlet port and two inlet ports, and wherein the inlet ports are on opposite sides of the pivot support for a rockable port closure member whereby rocking of the closure member to open one inlet port closes the other.

Further objects and advantages relating to simplicity in construction and ease of assembly and efficiency in use will appear from the following description and the appended drawing; wherein Fig. 1 is an elevation in section of a preferred form of my invention;

Figure 1:
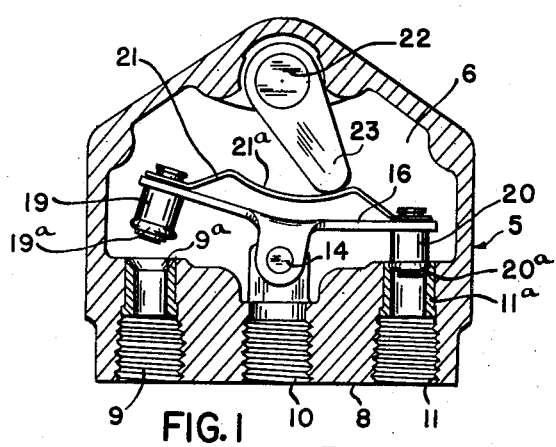

The valve body indicated in its entirety as at 5 comprises a die casting providing a chamber 6 and a removable cover plate 7. The lower wall of the valve body indicated at 8 in Fig. 1 is provided with an inlet bore 9, an outlet bore 10 and an inlet bore 11. The inlet bores 9 and 11 may be connected to separate sources of supply, such as for example two fuel tanks (not shown). The bores 9, 10 and 11 are interiorly threaded in the body to provide for the attachment of tube or hose couplings. The inlet bores 9 and 11 are provided at the interior of the body with valve seat members 9a and 11a. The back wall 12 of the valve body is provided with an opening 13 to support a transverse pin 14 which has its other end supported in a recess as at 15 in the cover plate 7. A rockable valve closure member 16 is formed from a metal stamping having down-turned ears 17 and 18 bored to receive the transverse pin 14. The enlarged head portion 14a of the pin maintains the member 16 laterally by contact with the ear 17.

At each end of the rocker member 16 a valve closure plug is provided. The plug indicated at 19 is adapted to close the inlet port 9 and the plug 20 is adapted to close the inlet port 11. A spring member 21 is secured to the upper side of the rocker member 16 and is in the form of a flat resilient metal strip anchored at each end of the rocker member 16. The central portion of the spring member 21 is formed arcuately as at 21a and is spaced from the manually operable member 22. Fixed to the shaft of the member 22 within the chamber 6 is a cam arm or lever 23 having a rounded end portion adapted to ride on the arcuate portion 21a of the spring member 21.

Preferably each of the valve plugs 19 and 20 are provided with an annular rubber-like O-ring seal as at 19a and 20a. The rocker 16 is formed so that the opposite arms thereof are not in the same plane with respect to its pivotal axes. This results in positioning the seal 20a of the closure plug 20 co-axially with the bore of the sleeve inlet 11a when the inlet port 11 is closed, and likewise facilitates the full opening of the other inlet port 9. The pin 22 is preferably provided with an O-ring seal as at 22a where it traverses the back wall 12 of the valve and the projecting exterior portion is provided with a squared shank as at 22b to receive a squared opening in an operating arm 30. The arm 30 is secured to the member 22 by a nut 31 which is threaded onto the end of the projecting portion of the pin 22. The arm 30 may be operated by a Bowden wire 33 which leads to a position convenient to the truck operator.

In the position shown in Fig. 1 the fuel is admitted to the valve body through the inlet port 9 which is open and the resilience of the member 21 biases the cam lever 23 to the right and the other inlet port 11 is closed by the plug 20. When the Bowden wire actuator 33 is moved so as to rock the lever 30, the cam lever 23 swings to the other end of the resilient member 21 and holds the inlet port 9 closed. The arrangement is such that the stable position of the parts closes one inlet port and opens the other. The intermediate position, that is, with the cam lever 23 directly in line with the pin 14, is an unstable position due to the bias of the spring member 21. This arrangement facilitates the use of fuel from two tanks alternatively and guards against the use of fuel from both tanks at the same time.

Figure 2:
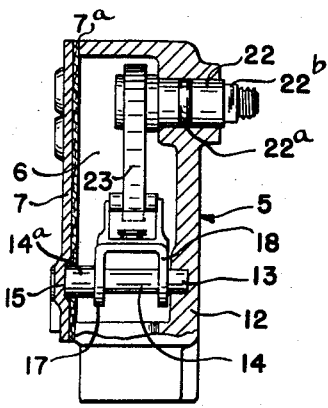
Fig. 2 is a sectional view taken at right angles to the view of Fig. 1.
Figure 3:
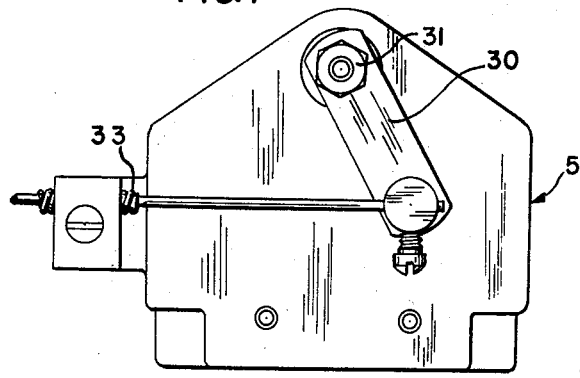
Fig. 3 is a plan view taken at the back of the valve and showing the manual operating mechanism.
Figure 4:
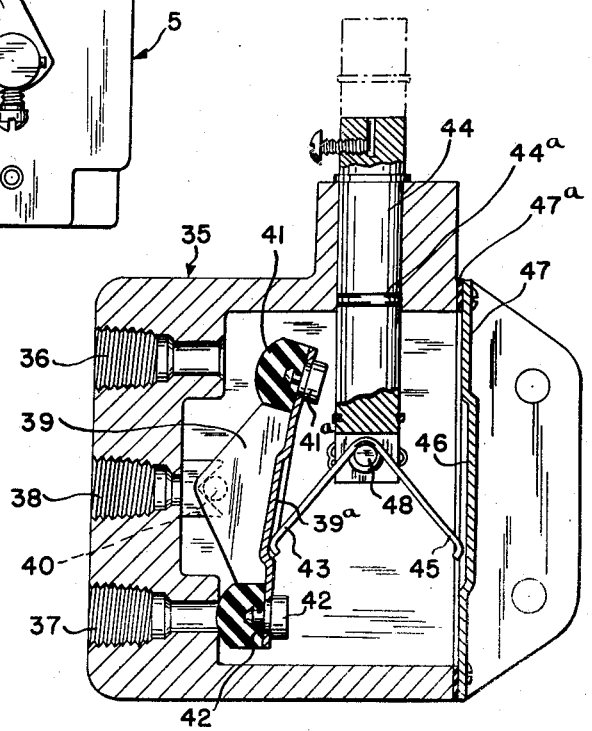
Fig. 4 is a sectional view of a modified form of valve made according to my invention.

In that form of the invention shown in Fig. 4, the valve body 35 is provided with inlet ports 36 and 37 and an outlet port 38. Rocker element 39 is mounted on a pin 40 journaled in the valve body transversely of the outlet port 38. The rocker 39 carries resilient closure plugs 41 and 42 adapted to close the ports 36 and 37 respectively. This form of closure which is a rounded neoprene plug, is riveted to the rocker 39 as at 41a and 42a and provides an effective seal where the inlet ports enter the valve chamber. The member 39 is preferably provided with an axially extending groove 39a which receives the rounded lower end 43 of a wire spring carried by the manually operated actuator 44. The opposite end of said wire spring as at 45 rides in an axially extending groove 46 formed in the valve cover plate 47. The assembly of this form of valve may be effected by inserting the rocker member 39 and its pin 40 into its open notch-like journals through the opening in the wall of the valve body. The slidable actuator 44 may then be inserted into the valve body and the spring wire 43—45 secured to the slotted inner end of the actuator 44 by pin 48 passing through a coil in the mid-portion of the spring wire 43—45. In operation, the member 44 is manually reciprocated by means of the Bowden wire or the like which causes the spring 43 to ride along the groove 39a from one side of the pivot 40 to the other. In this modification it will be noted that the rocker 39 is biased to either close port 36 or 37. As in the preferred embodiment, the stable position of the valve is with one inlet port closed and the other port open. In both forms of valve the covers are provided with gaskets and the actuating members with O-ring seals. The gasket 7a is held in place by cover 7 in the form of Fig. 2. In the form of Fig. 4 the gasket 47a is held by 47 and the O-ring 44a seals the shaft 44.

Although I have shown and described two forms of my invention in considerable detail, it will be appreciated by those skilled in the art that modifications may be made therein without departing from the scope of the invention as defined in the following claims:

What is claimed is:

1. A selector valve comprising a body having an integrally formed back wall and side walls with said side walls disposed normal to the back wall to form a chamber, a cover plate spanning said side wall to enclose the chamber, one of said side walls having an outlet bore centrally thereof and an inlet bore at each side of the outlet bore, a pivot pin mounted in the chamber in alignment with said outlet bore, said pin being supported in the chamber transversely of the outlet bore, a rocker member mounted on said pivot pin intermediate its ends and proportioned so that the ends thereof overhang said inlet bores, a chamfered valve seat in the chamber at each of said inlet bores, said rocker member having the portions thereof at each side of its pivotal mounting angularly related to each other, a valve closure member carried at each end of the rocker member and having a diameter exceeding the diameter of the seat in the inlet bores, and an O-ring seal carried by each of the valve closure members on the side thereof adjacent the chamfered valve seat, said O-ring seal having an outer diameter corresponding substantially to the maximum diameter of said chamfered valve seat, each of said valve closure members being moved in an arcuate path by pivotal movement of the rocker member on its pivot pin, said arcuate path of each valve member being coincident with the axis of its inlet bore as the valve closure member reaches the valve seat, a leaf spring mounted on the rocker member on that side thereof away from the outlet and inlet bores, said leaf spring having a central arcuate portion concave away from the rocker member and having diverging end portions secured to the rocker member adjacent the valve closure member, an actuating shaft pivoted in the wall of the body spaced from said leaf spring, an arm on said shaft having a cam surface at the end thereof adapted to bear on said arcuate portion of the leaf spring to move said rocker to one or the other of the valve closing position, means for limiting the movement of the arm about the pivot axis of the shaft to prevent disengagement of said cam surface from said leaf spring, said arm and the arcuate portion of said leaf spring being proportioned so that the distance from the pivot axis of the actuating shaft to the end of the cam on the arm is greater than the distance from said pivot axis to all surfaces on the arcuate portion of the leaf spring except the surface in contact with the cam and so that when one or the other of the valves is in its valve closing position such valve is biased to such closed position whereby the rocker arm is biased to close one or the other of said inlet bores.

2. A selector valve comprising a body having an integrally formed back wall and side walls, one of said side walls being disposed normal to the back wall and a cover for the body to form a chamber, said one side wall having an outlet bore centrally thereof and an inlet bore at each side of the outlet bore, a pivot pin mounted in the chamber adjacent said outlet bore and transversely thereof, a rocker member mounted on said pivot pin intermediate its ends and proportioned to overhang said inlet bores, a chamfered valve seat in the chamber at each of said inlet bores, said rocker member having portions thereof at each side of its pivotal mounting provided with a valve closure member, said member having a diameter exceeding the minimum diameter of said valve seat, each of said closure members having a resilient seal carried thereby adjacent the valve seat and adapted to enter the large diameter portion of the chamfered valve seat, each of said valve closure members being moved in an arcuate path by turning said rocker member, said arcuate path being coincident with the axis of the inlet bore as the valve closure members reach the valve seat, a leaf spring mounted on that side of the rocker arm away from the outlet and inlet bores, the end portions of said leaf spring being secured to the rocker arm and the intermediate portion of the leaf spring being generally arcuate and spaced from the rocker arm by the end portions of the leaf spring, said arcuate portion of the leaf spring being concave on that side away from the rocker arm to provide a curved bearing surface, an actuating shaft pivoted in the valve body in alignment with the outlet bore and the rocker member pivot, said actuating shaft being spaced from said leaf spring, an arm on said actuating shaft having a cam on the end thereof adapted to ride on the arcuate bearing surface of said leaf spring to move said rocker to one or the other of the valve closing position, means for limiting the movement of the arm about the pivot axis of the shaft to prevent disengagement of said cam surface from said leaf spring, said leaf spring and arm being proportioned with respect to each other so that the distance from the pivot axis of the actuating shaft to the cam surface on the arm is greater than the distance from the pivot axis of the actuating shaft to all other surfaces of the arcuate spring portion except that portion of the spring in contact with the cam and so that when one or the other of the valves is in its valve closing position such valve is biased to such closed position whereby the rocker arm is biased to close one or the other said inlet bores.

References Cited in the file of this patent

UNITED STATES PATENTS

| | | |
|---|---|---|
| 1,177,100 | Grandjean | Mar. 28, 1916 |
| 2,274,917 | Carlson et al. | Mar. 3, 1942 |
| 2,311,464 | Parker | Feb. 16, 1943 |
| 2,311,465 | Parker | Feb. 16, 1943 |